(12) United States Patent
Payne

(10) Patent No.: US 10,822,071 B2
(45) Date of Patent: Nov. 3, 2020

(54) CONTOUR RETENTION IN SEGMENTED FUSELAGE ASSEMBLIES

(71) Applicant: The Boeing Company, Chicago, IL (US)

(72) Inventor: James Steven Payne, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 84 days.

(21) Appl. No.: 16/190,381

(22) Filed: Nov. 14, 2018

(65) Prior Publication Data
US 2019/0084663 A1 Mar. 21, 2019

Related U.S. Application Data

(62) Division of application No. 15/189,872, filed on Jun. 22, 2016, now Pat. No. 10,160,531.

(51) Int. Cl.
| | | |
|---|---|---|
| *B64C 1/12* | (2006.01) | |
| *B64F 5/50* | (2017.01) | |
| *B64C 5/10* | (2006.01) | |
| *B64C 1/06* | (2006.01) | |
| *B64F 5/10* | (2017.01) | |
| *B64C 1/00* | (2006.01) | |

(52) U.S. Cl.
CPC ............ *B64C 1/12* (2013.01); *B64C 1/068* (2013.01); *B64F 5/10* (2017.01); *B64F 5/50* (2017.01); *B64C 2001/0081* (2013.01)

(58) Field of Classification Search
CPC ... B64C 1/12; B64C 1/068; B64C 2001/0081; B64F 5/10; B64F 5/50
See application file for complete search history.

(56) References Cited

U.S. PATENT DOCUMENTS

2014/0077471 A1* 3/2014 Chang ............... B64C 1/068
                                                    280/107
2014/0331473 A1* 11/2014 Smith ............... B64F 5/10
                                                    29/429

FOREIGN PATENT DOCUMENTS

WO    2014023284 A2    2/2014

OTHER PUBLICATIONS

Canadian Office Action; Application 2962547; dated Apr. 27, 2020.
Russian Office Action; Application 2017106799/11(011825); dated Jun. 1, 2020.

* cited by examiner

*Primary Examiner* — John C Hong
(74) *Attorney, Agent, or Firm* — Duft & Bornsen, PC

(57) ABSTRACT

Systems and methods are provided for enforcing contours onto parts of an aircraft. One embodiment is a method for enforcing a contour onto aircraft parts. The method includes removably attaching segmented ring details to aircraft skin details, attaching stringers to skin details to create skin assemblies, positioning skin assemblies at a support structure defining a contour, and fastening frames to the skin assemblies to create a panel. The method also includes removably installing a spreader section onto the panel to complete assembly of a brace prior to removal of the panel, transporting the panel while the brace enforces the contour, attaching the brace to braces for other panels to form a barrel section of a fuselage for an aircraft while the brace enforces the contour, and removing the brace from the barrel section after the barrel section has been formed.

20 Claims, 17 Drawing Sheets

CONTOUR RETENTION IN SEGMENTED FUSELAGE ASSEMBLIES

FIELD

The disclosure relates to the field of aircraft, and in particular, to assembly of aircraft fuselage components.

BACKGROUND

Aircraft fuselages define an interior of an aircraft, and provide structural integrity to ensure that an aircraft exhibits sufficient strength to withstand the rigors of flight. For aluminum aircraft, pieces of fuselage may be created as panel assemblies, which are then assembled into barrel sections. The barrel sections are attached to each other in the lengthwise direction to form a lengthwise tube.

In order to form each panel assembly, pieces of aircraft skin known as skin details may be fastened to corresponding lengthwise stringers according to a contour. This combination of skin details and stringers is known as a skin assembly. These skin assemblies may also have frames (also known as frame segments/elements) arranged, hoop-wise relative to the stringers, that help to hold contour. Multiple skin assemblies may be attached via longitudinal skin splices and hoopwise frames, resulting in a completed super panel conforming to the contour. That is, the combination of skin assemblies and frames is known as a super panel. Super panels may be fabricated from multiple skin assemblies, and super panels are joined to other super panels form a barrel section. That is, individual super panels are attached together to form a barrel section (e.g., a portion of the fuselage having a substantially circular cross-section) consisting of multiple super panels. For example, each super panel may form a ninety degree hoop-wise arc of the barrel section, and four super panels may be attached together to complete the barrel section. Hereinafter, "super panels" may be referred to simply as "panels." The panels are formed with a desired contour using methods and/or assembly structures.

However, after a panel is removed from its assembly structure and before the panel has been combined with other panels into a barrel section, it is not uncommon for the panel contour to undesirably change. This change in shape away from a desired contour defined during the panel assembly is unwanted, as it complicates the process of assembling multiple panels into a single unified barrel section. Thus, it is desired to enhance fabrication techniques for barrel sections that avoid this issue.

SUMMARY

Embodiments described herein utilize enhanced braces which are capable of maintaining/holding/enforcing a desired contour within a panel (e.g., in order to hold a panel to a contour defined by a support structure for the panel, regardless of whether the panel is still attached to the support structure). The braces are smaller and lighter than the support structure used to hold contour of the panel during assembly/fastening. Hence, the braces are capable of traveling with the panel to a location where the panel will be combined with other panels into a barrel section. Furthermore, the braces are temporary and removably attached, which ensures that the braces do not occupy space within a completed barrel section of a completed aircraft.

One embodiment is a method for enforcing a contour onto aircraft parts. The method includes removably attaching segmented ring details to aircraft skin details, attaching stringers to skin details to create skin assemblies, positioning skin assemblies at a support structure defining a contour, and fastening frames to the skin assemblies to create a panel. The method also includes removably installing a spreader section onto the panel to complete assembly of a brace prior to removal of the panel, transporting the panel while the brace enforces the contour, attaching the brace to braces for other panels to form a barrel section of a fuselage for an aircraft while the brace enforces the contour, and removing the brace from the barrel section after the barrel section has been formed.

Another embodiment is an apparatus for enforcing a contour onto aircraft parts. The apparatus includes a brace that mounts to an end of a panel of aircraft fuselage and enforces a contour onto the panel, the brace enforcing the contour during transport with the panel. The brace includes a segmented ring assembly attached to skin details of the panel, a spreader bar attached to the segmented ring assembly at endpoints of an arc defined by the segmented ring assembly, and struts that attach the spreader bar to the segmented ring assembly.

Another embodiment is a further apparatus. The apparatus includes a support structure defining a contour for shaping panels of fuselage for an aircraft, and a panel that is mounted to the supports. The panel includes multiple skin details that follow the contour, and stringers and frames that attach the skin details together. The apparatus also includes a brace that is mounted to an end of the panel, is distinct from the supports, and enforces the contour during transport with the panel. The brace includes a segmented ring assembly attached to the skin details, a spreader bar attached to the segmented ring assembly at endpoints of an arc defined by the segmented ring assembly, and struts that attach the spreader bar to the segmented ring assembly.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
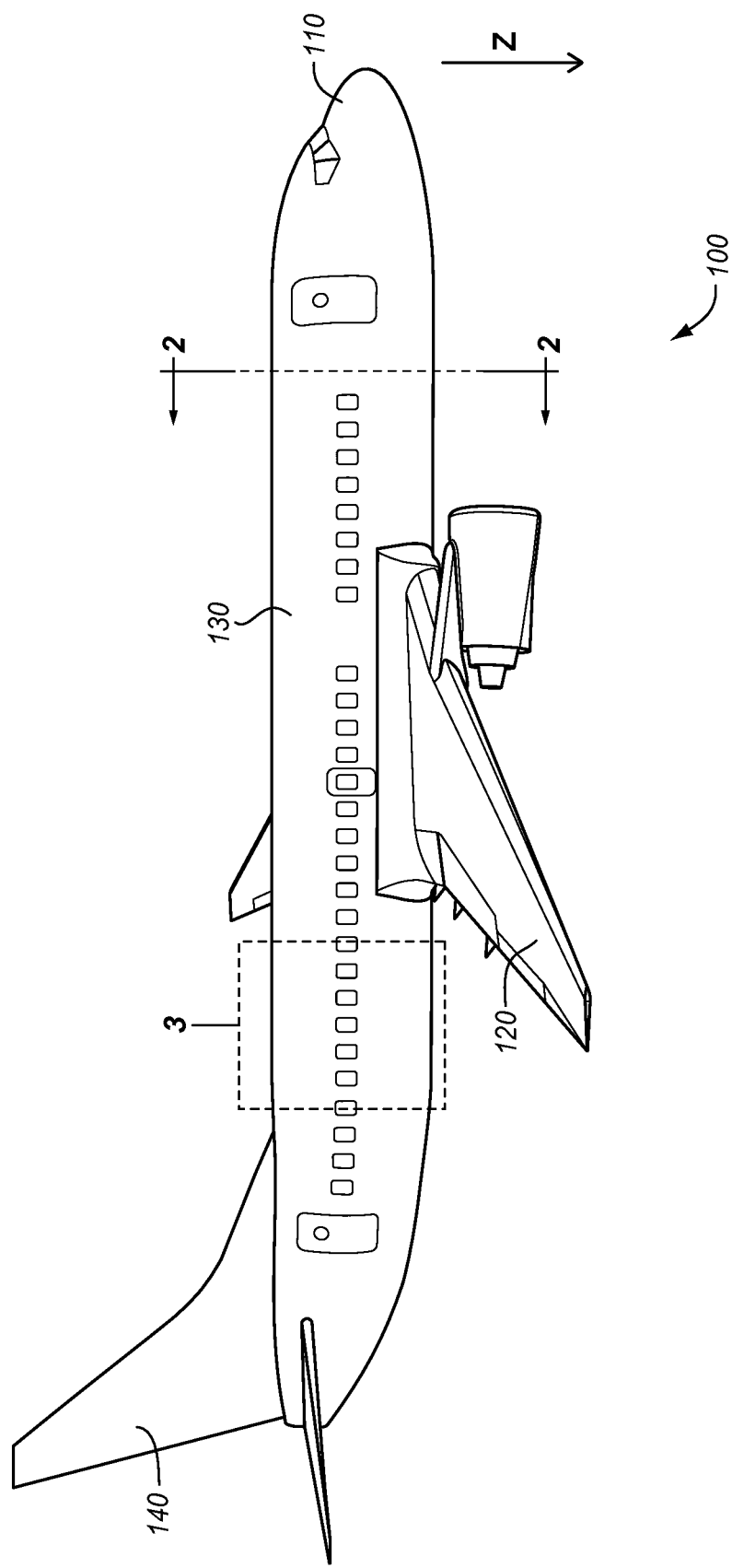
FIG. 1 is a diagram of an aircraft in an exemplary embodiment.
Figure 2:
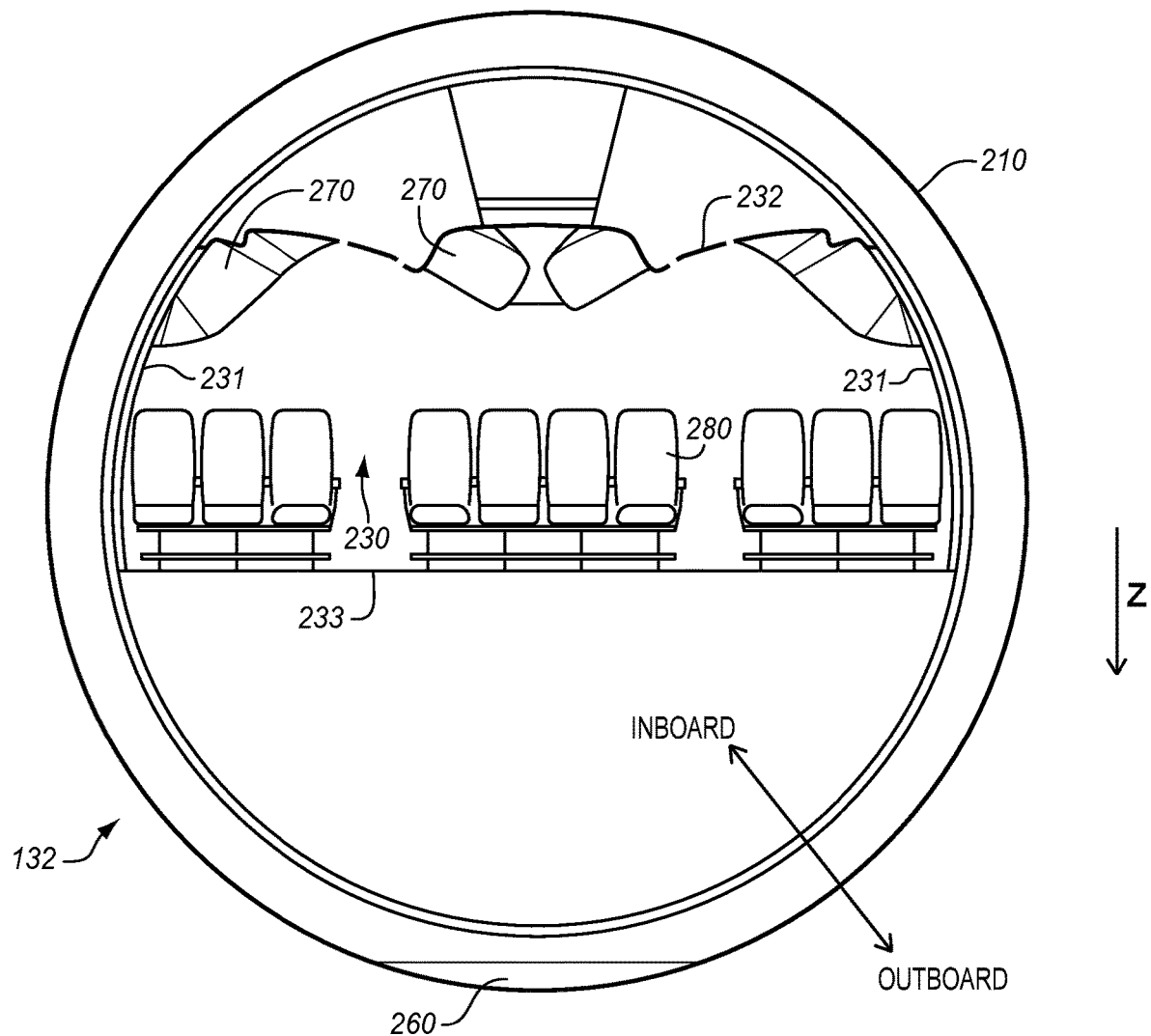
FIG. 2 is a view of an interior of an aircraft in an exemplary embodiment.
Figure 3:
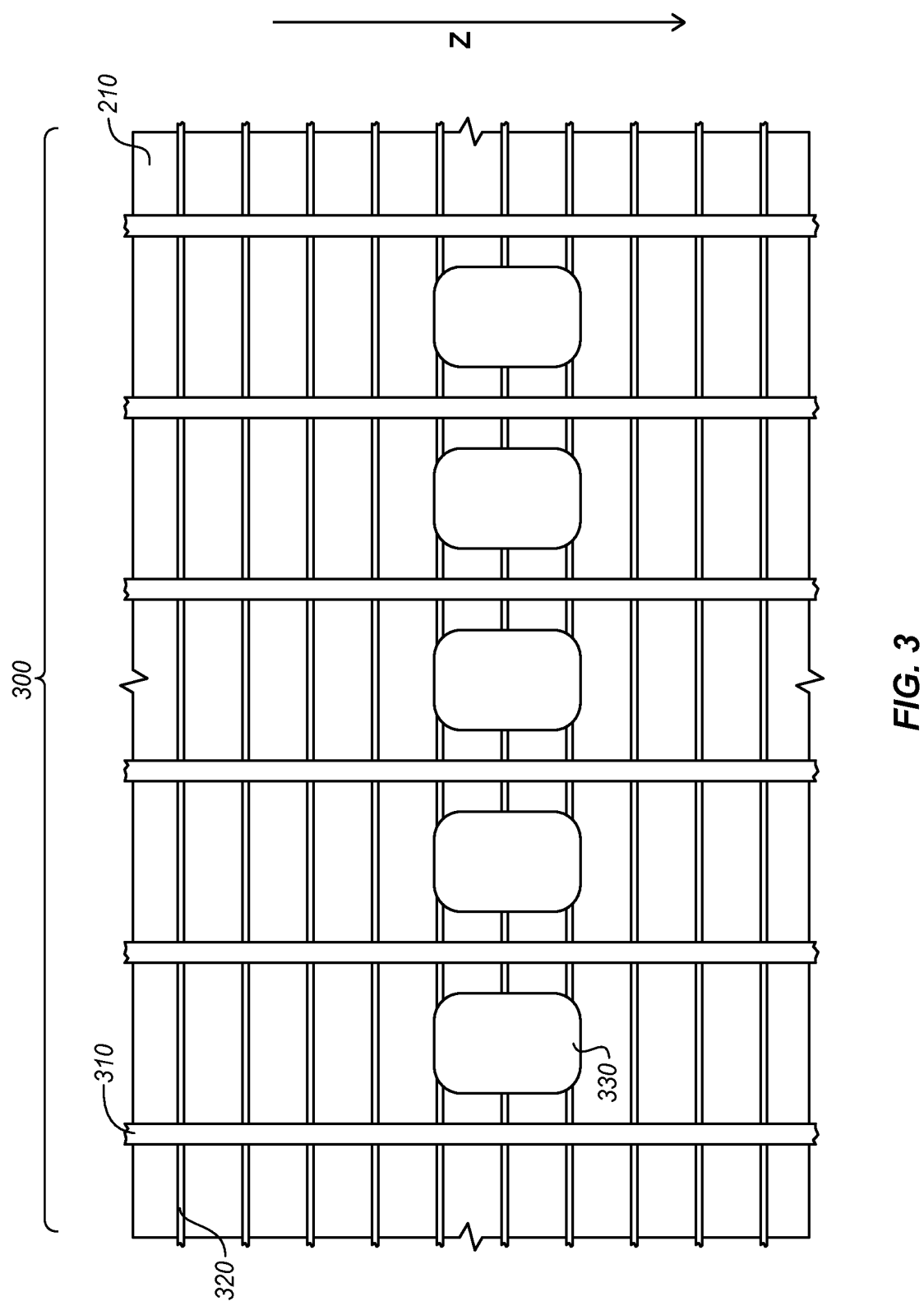
FIG. 3 is a view of a panel of an aircraft in an exemplary embodiment.

FIGS. 1-3 illustrate the structure of an aircraft 100 that includes barrel sections of fuselage assembled from individual panels in an exemplary embodiment. Aircraft 100 includes nose 110, wings 120, fuselage 130, and tail 140. FIG. 1 also illustrates a downward direction (Z) for aircraft 100. In this embodiment, fuselage 130 of aircraft 100 has been fabricated utilizing enhanced braces (discussed below).

FIG. 2 is a cross-section view of aircraft 100 indicated by view arrows 2 in FIG. 1. Specifically, FIG. 2 illustrates a "barrel" section 132 of fuselage 130 of FIG. 1. Barrel section 132 holds floor 233, ceiling 232, and sidewalls 231, which form cabin 230. Seating 280 and storage 270 are also included, as is drainage 260. Cabin 230 is surrounded by skin details 210 of barrel section 132. As used herein, a skin detail comprises a single integral section of skin for aircraft 100, which provides structural strength to aircraft 100. For example, an access panel is not a skin detail. FIG. 2 further illustrates that an outboard direction proceeds towards an external surface (e.g., skin details 210) of aircraft 100, and an inboard direction proceeds towards the interior (e.g., cabin 230) of aircraft 100.

FIG. 3 is a diagram illustrating a panel 300 of fuselage 130 of FIG. 1 in an exemplary embodiment. FIG. 3 is a view of an interior of section 3 in FIG. 1. In FIG. 3, various structural components (310, 320, 330, 210) are illustrated. For example, FIG. 3 illustrates that panel 300 includes stringers 320 and frame elements 310. Stringers 320 provide longitudinal support to skin details 210 (e.g., aluminum sheets), while frames 310 (e.g., ribs of the aircraft) provide hoop-wise skin support. In one embodiment, frames 310 are spliced together to wrap around the fuselage in the hoop-wise direction, and stringers 320 are spliced together and run longitudinally from nose to tail. Thus, stringers 320 and frames 310 are oriented perpendicular to each other. Cutouts 330 (e.g., for windows) penetrate through skin details 210. With this understanding of aircraft geometry in mind, deviations from a desired shape of barrel section 132 are discussed.

Figure 4:
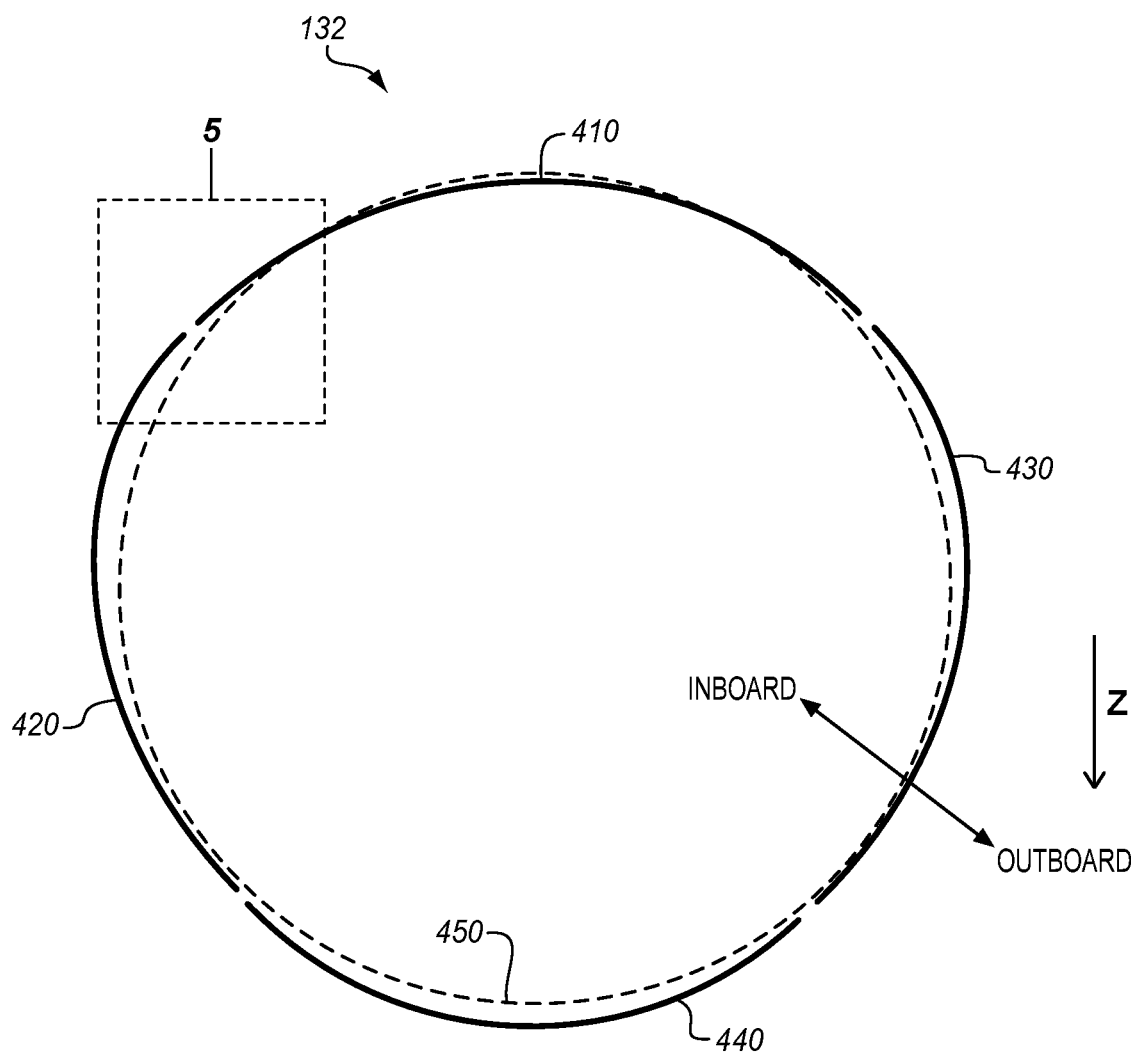
FIG. 4 is a diagram illustrating deviations of panels from desired contours in an exemplary embodiment.

FIG. 4 is a diagram illustrating deviations of panels from desired contours in an exemplary embodiment. FIG. 4 is a view shown by view arrows 2 in FIG. 1. According to FIG. 4, panels 410, 420, 430, and 440 are each designed to occupy a ninety degree arc of a completed barrel section 132. Panels 410-440 are initially formed to match/conform to a contour 450 (e.g. a desired Outer Mold Line (OML) contour, in this embodiment, a circle), but when panels 410-440 are removed from the support structure that initially formed them, panels 410-440 may be under-contoured or over-contoured. This means that when panels 410-440 are placed onto arches for assembly, the panels do not align properly with each other or the desired shape of barrel section 132. This in turn causes a problem when attempting to assemble panels 410-440 into barrel section 132 via skin lap joints.

Figure 5:
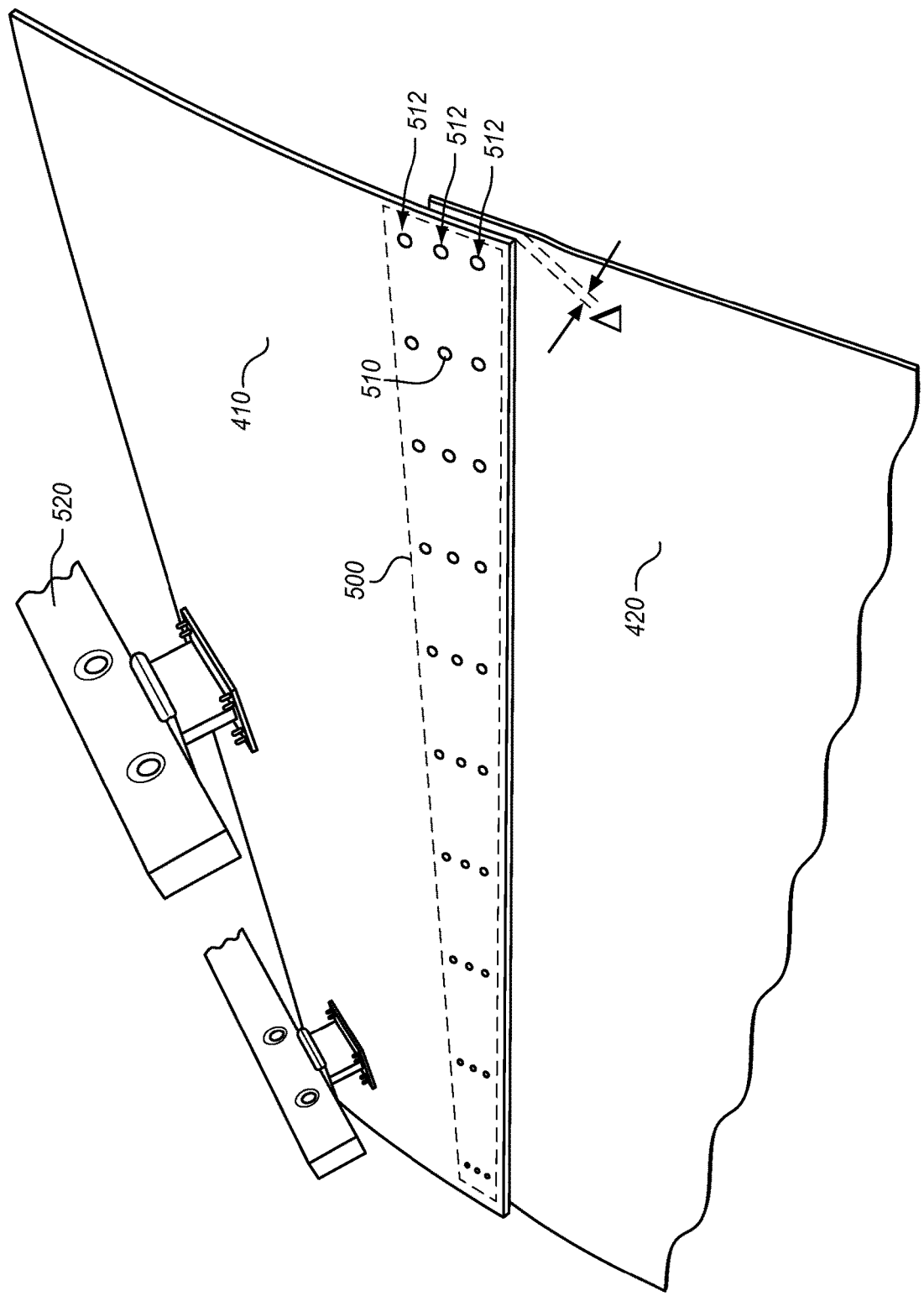
FIG. 5 is a diagram illustrating a skin lap between two panels of aircraft fuselage in an exemplary embodiment.

FIG. 5, which is a view of section 5 of FIG. 4, illustrates a skin lap joint 500. Skin lap joint 500 is created by overlapping panels 410 and 420, and then driving multiple rows 512 of fixation elements 510 (e.g., rivets, bolts, pins) into the overlapped panels. However, even though panels 410 and 420 are held in arches 520, they may still exhibit a deviation of shape from contour 450. This results in a difference of position A at scaffold 520, which in turn increases the difficulty of properly applying rows 512 of fixations elements 510 to secure skin lap joint 500. The deviation also means that a full barrel section 132 of aircraft 100 will not be curved properly and therefore will not fit over a bulkhead of an adjacent barrel section, complicating the assembly of fuselage 130. Furthermore, problems are encountered when joining the skins and stringers of succeeding barrel sections, in that misaligned sections may need shimming and other means of joining to overcome any mismatching. In a similar fashion tight/clashing areas on adjacent barrel sections may dish/ramp.

To address this problem with panel contour adherence, an enhanced brace is provided to enforce a contour onto the panels of a barrel section. The placement of the brace in relation to a support structure for a panel (e.g., a jig used to initially assemble/fabricate the panel) is described with regard to FIGS. 6-14. The brace holds the ends of the barrel within the tolerance for a desired contour, in order to facilitate barrel section joining.

Figure 6:
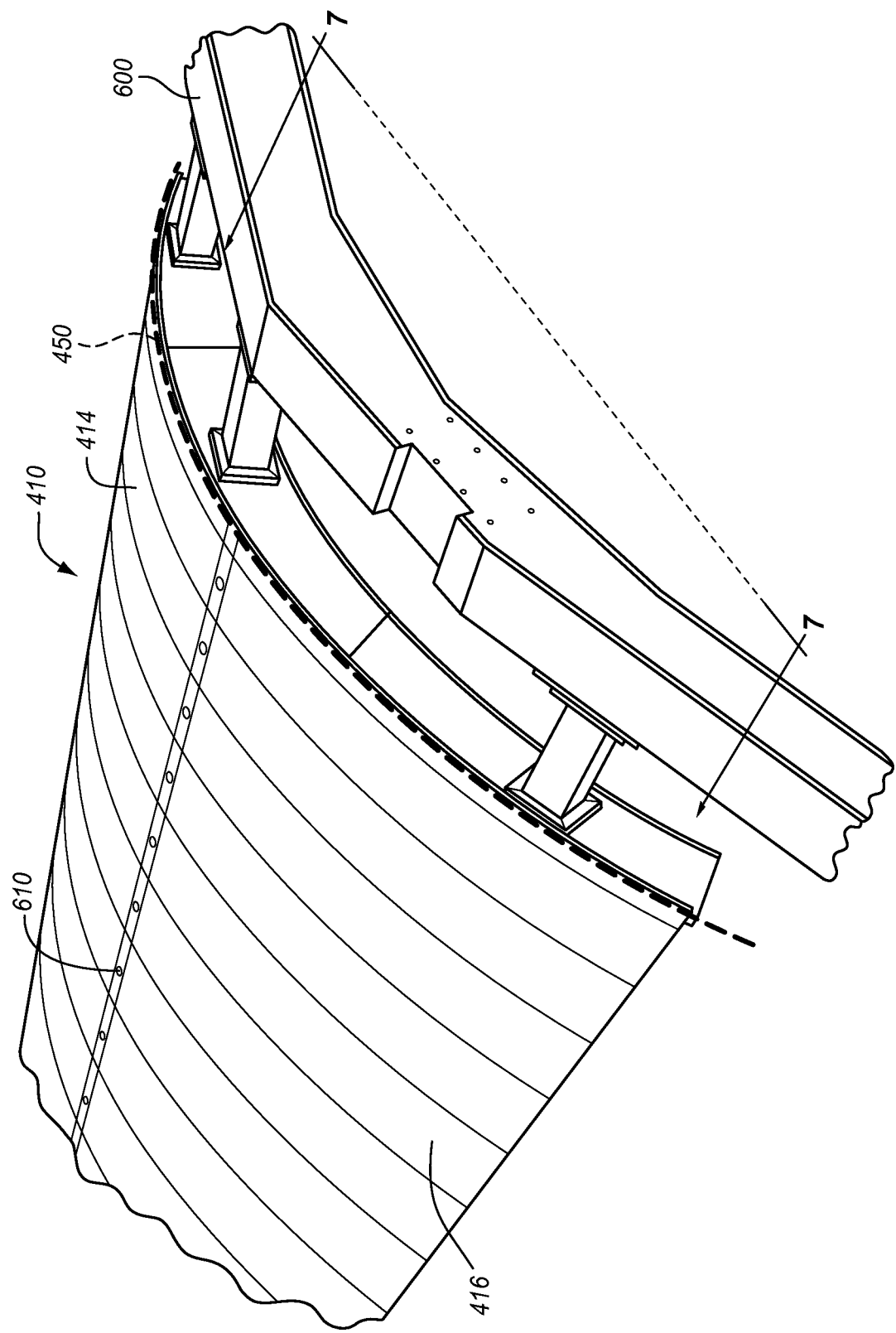
FIG. 6 is a diagram illustrating assembly of a panel at a support structure in an exemplary embodiment.

FIG. 6 is a diagram illustrating assembly of panel 410 at support structure 600 in an exemplary embodiment. In this embodiment, support structure 600 is a jig upon which a panel (e.g., panel 410) is held to contour 450. However, in further embodiments, support structure 600 may comprise multiple supports utilized to facilitate determinate assembly processes. At this point in time, panel 410 comprises multiple skin assemblies, including skin assembly 412 (which is hidden on the far side of support structure 600, but shown in FIG. 9), skin assembly 414, and skin assembly 416. Before skin assemblies 412-416 are mounted to support structure 600, skin assemblies 412-416 may be created by attaching stringers 320 and ring details 852-856 to skin details 210. Determinate assembly holes 610 used for skin laps are aligned to position panels with respect to each other. This allows for skin assemblies 412-416 to be attached together frames 310 (as shown in FIG. 3) according to contour 450. In FIG. 6, stringers 320 and frames 310 are not visible, as these elements are located on the underside of panel 410.

Figure 7:
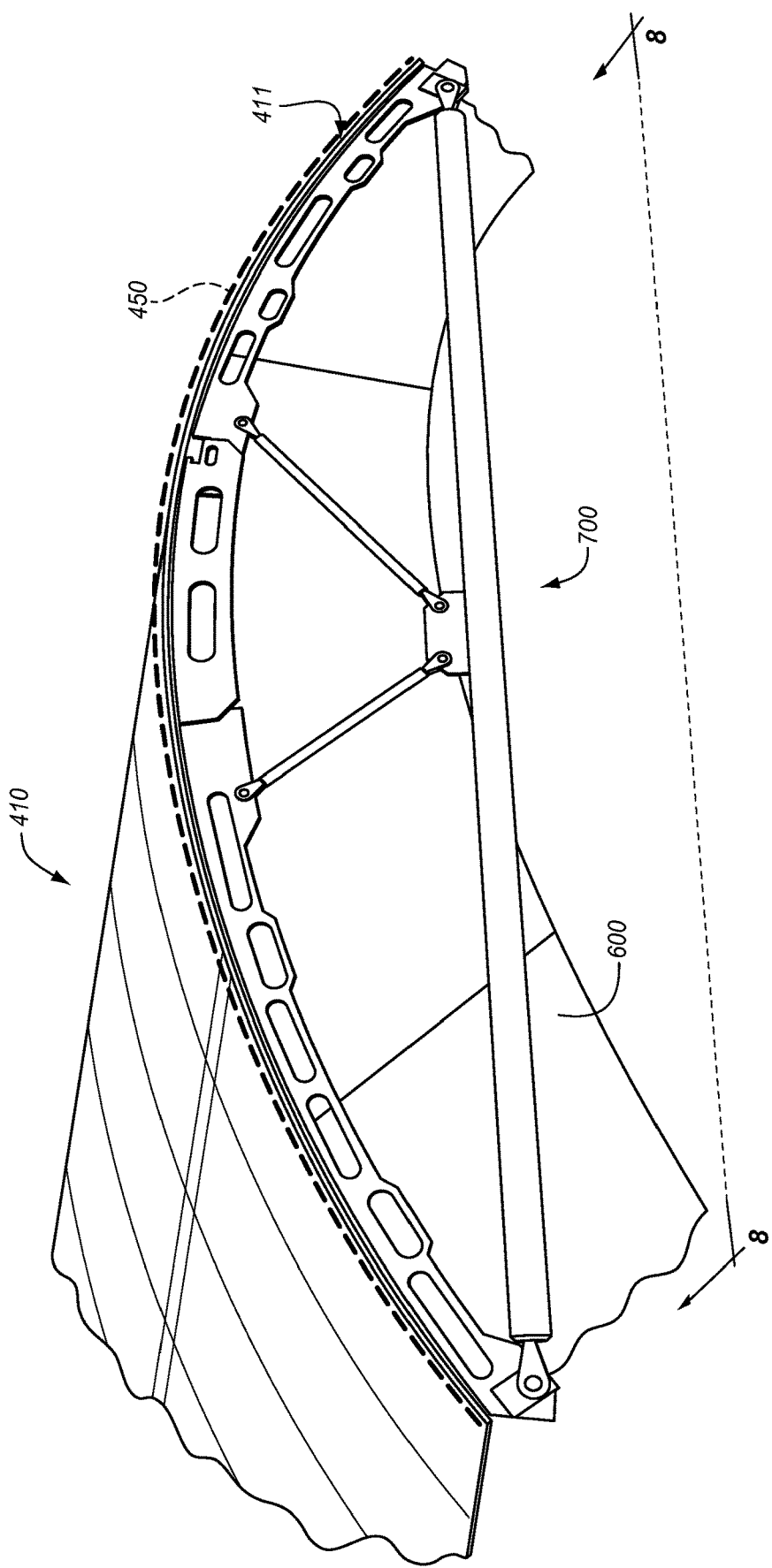
FIG. 7 is a diagram illustrating a brace attached to a panel that is attached to a support structure in an exemplary embodiment.

After frames 310 have been attached but before panel 410 has been removed from support structure 600, brace 700 may be attached to panel 410 at an end 411 of panel 410 as shown in FIG. 7. FIG. 7 is a view indicated by view arrows 7 of FIG. 6. Further details of brace 700 are illustrated in FIGS. 8-12, which illustrate relationships between panel 410 and brace 700, and further illustrate variations in design of brace 700. Brace 700 attached to panel 410 is jointed. These joints (described further herein as attachment points) coincide with splices as the joints may be joined when the splices are spliced together as part of maintaining a desired contour as panels 410-440 are joined to form a barrel section. The braces of the super panels may further be spliced together to form one single brace. The joints described herein for braces 700 may further coincide with the skin lap splices described herein.

Figure 8:
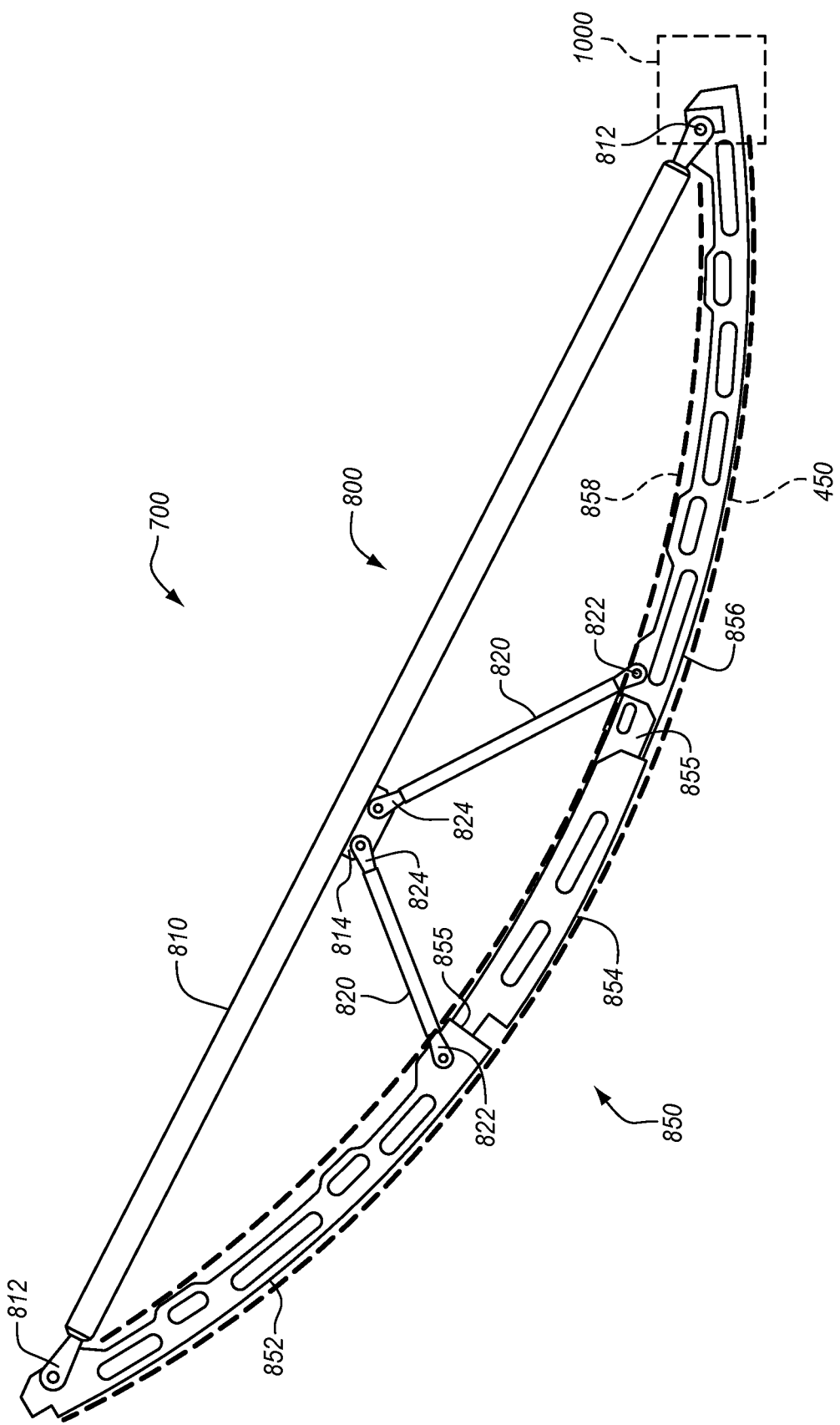
FIG. 8 is a diagram of a brace in an exemplary embodiment.
Figure 9:
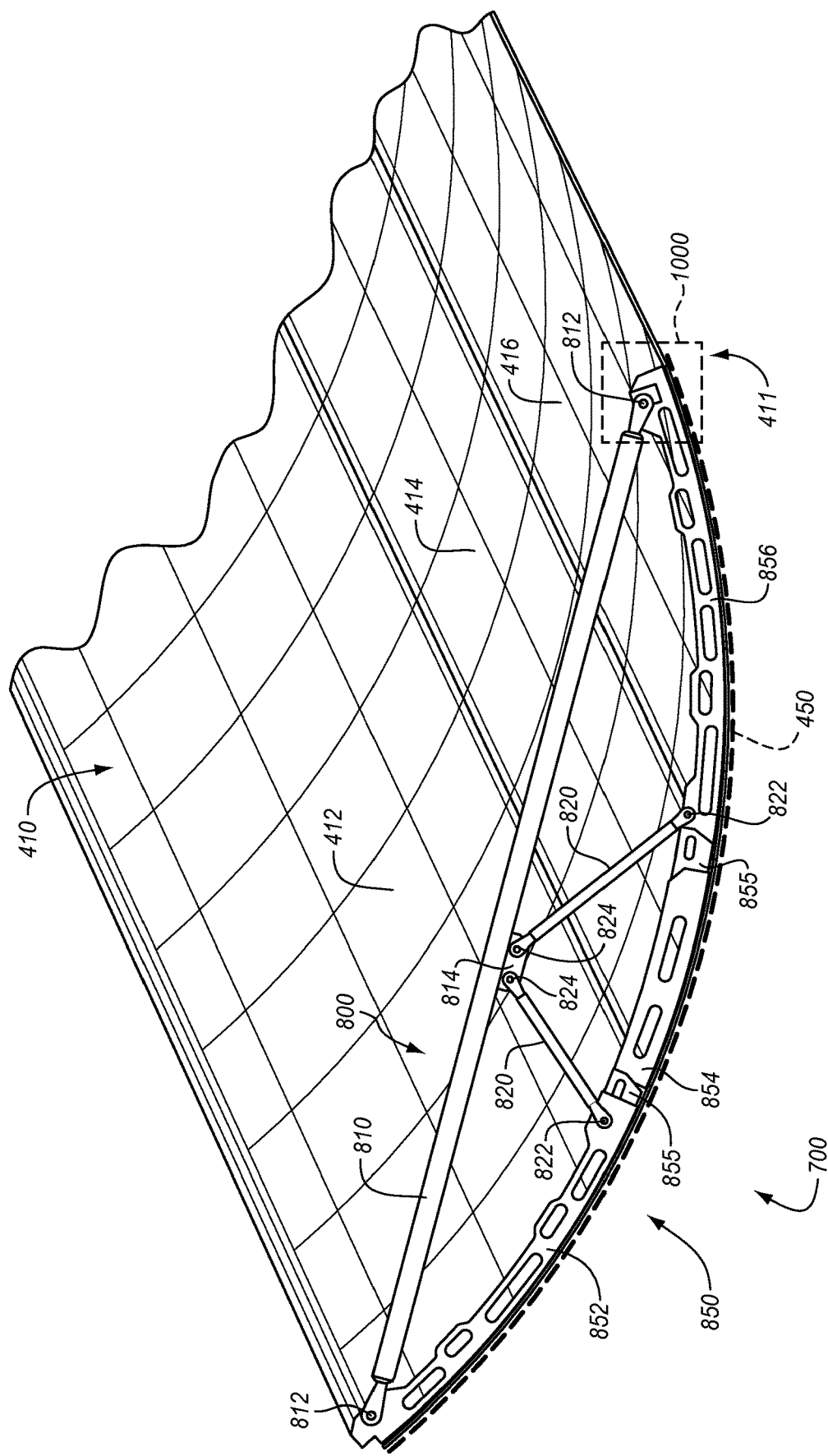
FIG. 9 is a diagram of a brace attached to a panel in an exemplary embodiment.

FIG. 8 is a diagram of brace 700 in an exemplary embodiment, according to the view indicated by view arrows 8 of FIG. 7. In FIG. 8, brace 700 comprises spreader section 800 and segmented ring assembly 850. In this embodiment, ring assembly 850 is dimensioned to directly and removably attach to a panel (e.g., via bolts or other fixation elements which are removable from ring assembly 850 without damaging panels 410-440, ring assembly 850, and/or or themselves), and to match the contour enforced on the panel by support 600. Meanwhile, spreader section 800 holds ring assembly 850 to a desired contour (e.g., contour 450) initially defined by a support structure (e.g., support structure 600). Spreader section 800 includes spreader bar 810, which is rotatably and/or removably attached (e.g., via a pin connection with a threaded end clevis) to ring assembly 850 via attachment point 812 (also referred to as "joints" above). Attachment points 812 constitute endpoints of arc 858 defined by ring assembly 850. Spreader section 800 also includes base 814, to which struts 820 are rotatably attached via attachment points 824. Struts 820 are further rotatably attached to ring assembly 850 via attachment points 822. Attachment points 822 may also be located along arc 858. Ring assembly 850 includes multiple ring segments 852, 854, and 856, which each are removably attached to a corresponding skin assembly (412, 414, 416, as shown in FIG. 9) and align with contour 450 of FIG. 7. Each ring segment (852, 854, 856) may also include a coupler 855 that enables attachment of the ring segments together to form ring assembly 850. Zone 1000 of FIG. 8 is a location where brace 700 may attach to another brace for another panel, and will be discussed in further detail below. In effect ring assembly 850 may be attached during or prior to assembly of a panel, while spreader section 800 may maintain contour at an assembled panel.

FIG. 9 illustrates mechanical connections/couplings between brace 700 and panel 410. Specifically, FIG. 9 is a diagram of brace 700 attached to end 411 of panel 410 in an exemplary embodiment. According to FIG. 9, panel 410 includes skin assemblies 412, 414, and 416. Ring segments 852, 854, and 856 are removably attached (e.g., via bolts, screws, or other removable fixation elements) to skin assemblies 412, 414, and 416 respectively. Spreader section 800 holds ring assembly 850 to contour 450. Thus, when attached to panel 410, brace 700 enforces contour 450 onto panel 410 in a manner that is independent of support structure 600. This allows panel 410 to be removed from support structure 600 and transported, without changing contour in an undesirable manner. Multiple panels (e.g., 410, 420, 430, and 440) held by braces 700 may then be arranged together and permanently attached (e.g., via rivet bolt, pin, etc.) in order to form a barrel section 132 of FIG. 4.

Figure 10:
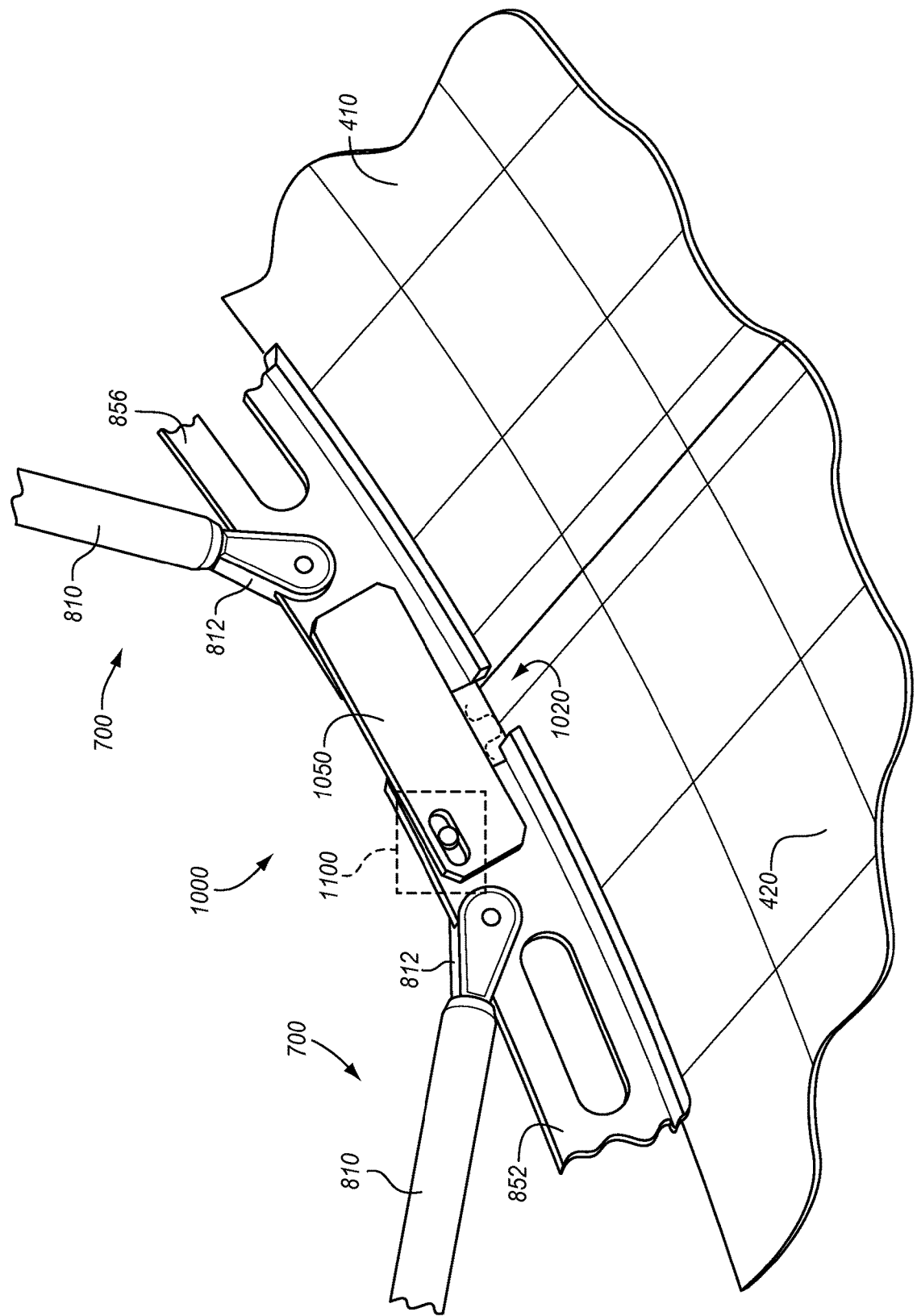
FIG. 10 is a diagram illustrating an attachment between two braces in an exemplary embodiment.
Figure 11:
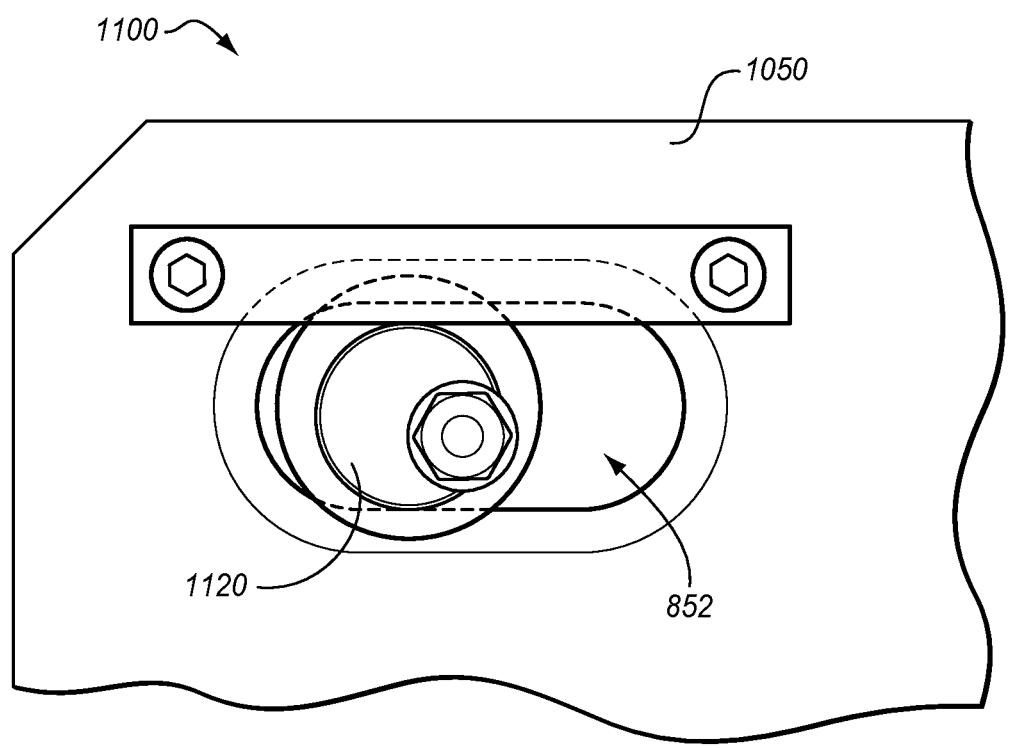
FIG. 11 is a diagram illustrating a zoomed in view of a fixation element holding two braces together in an exemplary embodiment.

Connections between braces 700 that are attached to panels (e.g., panels 410-440) may be beneficial when aligning the panels together to ensure that the panels are assembled properly to form barrel section 132. Braces 700 may be utilized to force the barrel sections to maintained circumferential tolerances so that one barrel section can be joined to a corresponding barrel section with minimal shimming and alignment efforts. FIG. 10 is a diagram illustrating an attachment between two braces 700 in order to secure panel 410 to 420 in an exemplary embodiment. Specifically, FIG. 10 is a zoomed in view of zone 1000 of FIG. 9. As shown in FIG. 10, a first spreader bar 810 of first brace 700 is attached to a ring segment 856 of first brace 700, while a second spreader bar 810 of second brace 700 is attached to a ring segment 852 of second brace 700. A coupler 1050 is utilized to join first brace 700 to second brace 700, connecting the braces together in zone 1100. Furthermore, coupler 1050 defines a space 1020 through which a stringer 320 may extend in order to facilitate fabrication processes of skin lap fastening. FIG. 11 is a zoomed in view of zone 1100 of FIG. 10. FIG. 11 illustrates a fixation element 1120 holding two braces together in an exemplary embodiment. As shown in FIG. 11, ring segment 852 of second brace 700 remains visible behind coupler 1050 of ring segment 856 of first brace 700. Furthermore, as shown in FIG. 11, fixation element 1120 may slide laterally as desired to account for tolerances associated with each panel. —Adjustments may be made to help the braces maintain a desired panel contour. In this embodiment, fixation element 1120 is an eccentric bushing that is slidably mounted to allow for tolerance adjustment between braces 700.

Figure 12:
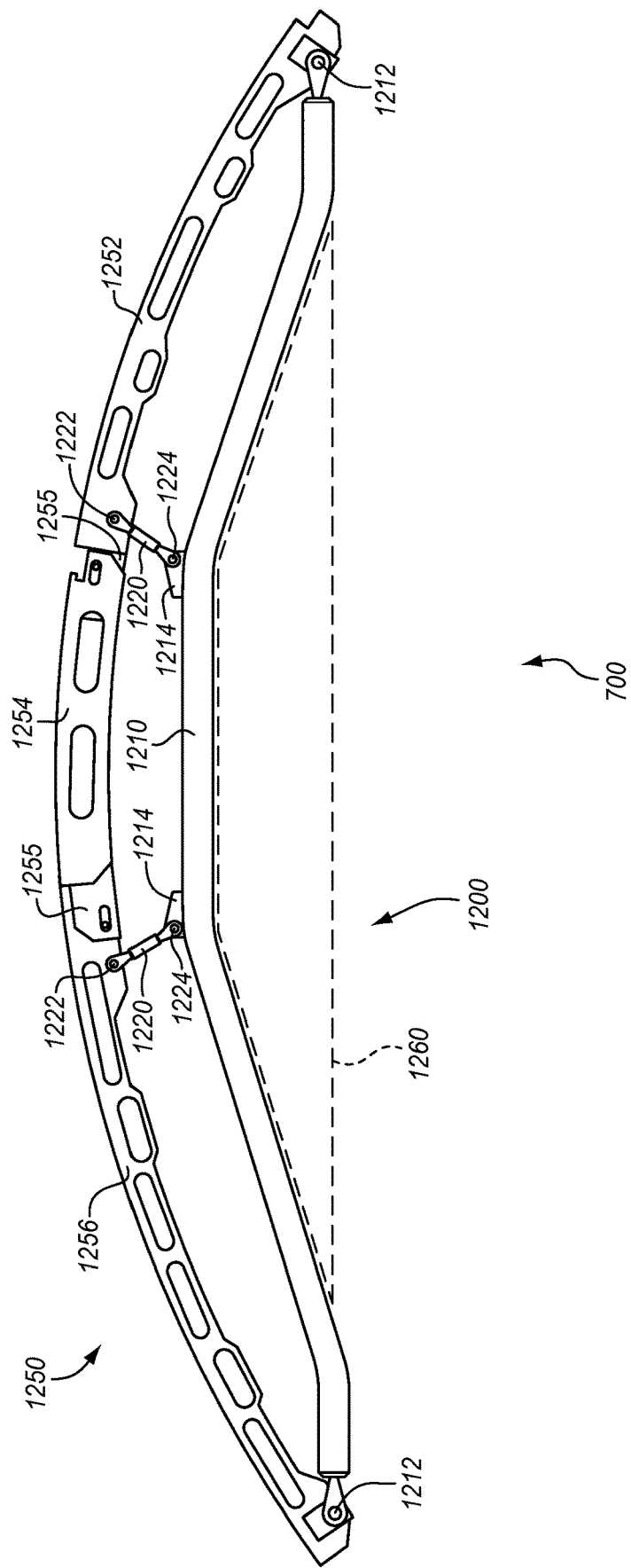
FIG. 12 is a diagram illustrating a further brace in an exemplary embodiment.

FIG. 12 is a diagram illustrating a further brace 700 in an exemplary embodiment. In this embodiment, brace 700 is non-linear (i.e., is not straight) and includes an indented region 1260. When used on top and bottom panels of an aircraft fuselage 130, indented region 1260 provides additional head and/or foot space for a technician to maneuver within fuselage 130 without tripping over or striking brace 700. That is, indented region 1260 allows for better head height access for mechanics when braces 700 are arranged into a barrel section 132. In this embodiment, brace 700 includes spreader section 1200, and segmented ring assembly 1250. Ring assembly 1250 directly (and removably) attaches to a panel (e.g., panel 410), while spreader section 1200 holds ring assembly 1250 to a desired contour initially defined by support structure 600. In this embodiment, spreader section 1200 includes spreader bar 1210, which is rotatably attached via attachment points 1212 to ring assembly 1250. Spreader section 1200 also includes bases 1214, to which struts 1220 are rotatably attached via attachment points 1224. Struts 1220 are also rotatably attached to ring assembly 1250, via attachment points 1222. Ring assembly 1250 includes multiple ring segments 1252, 1254, and 1256, which each are removably attached to a corresponding skin assembly (e.g., 412, 414, 416, as shown in FIG. 9). Each ring segment may also include a coupler 1255 that enables attachment of the ring segments together into a single rigid segmented ring assembly 1250.

Figure 13:
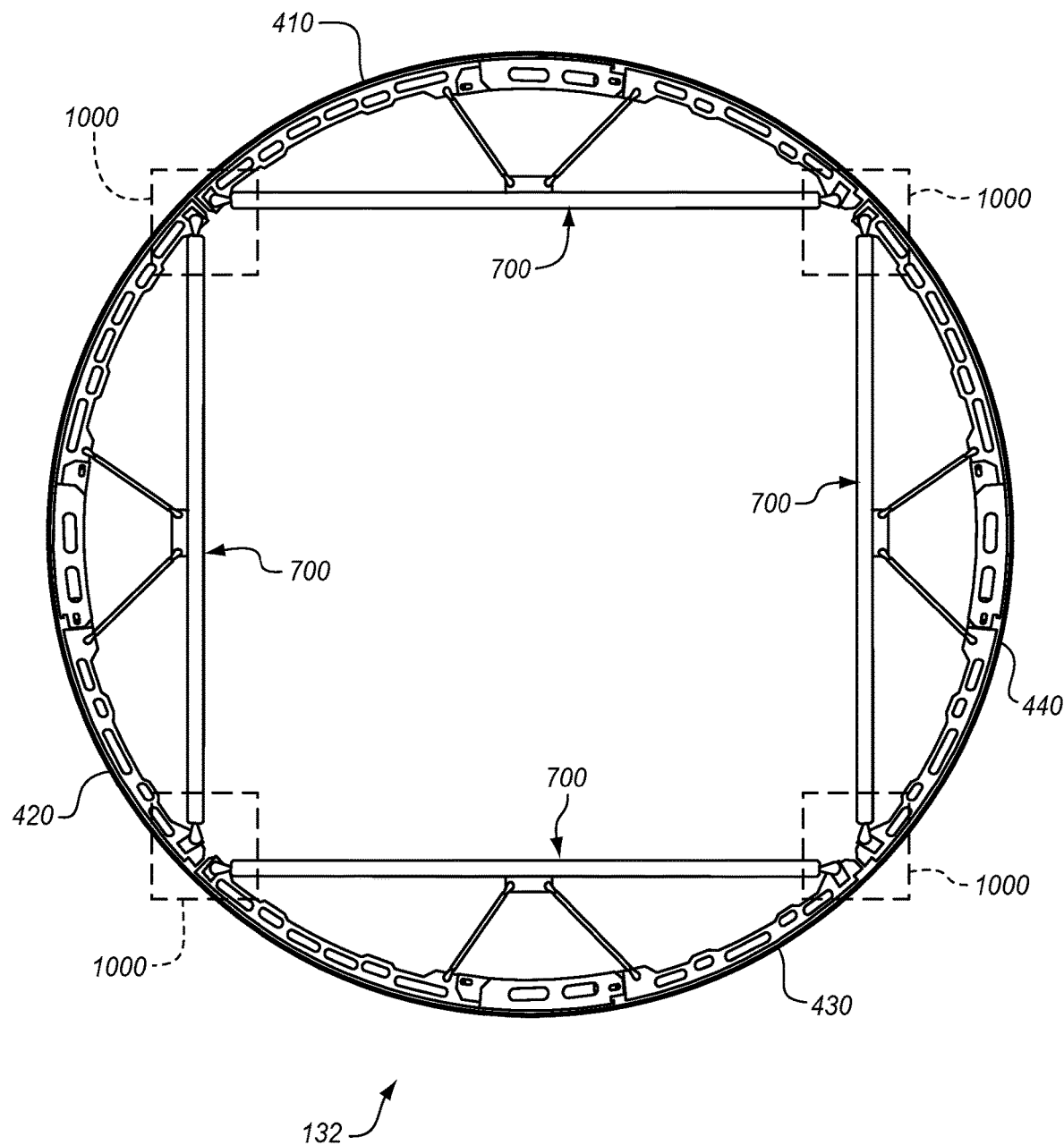
FIG. 13 is a diagram illustrating multiple braces attached together to hold multiple panels into a barrel section in an exemplary embodiment.

Both of the types of brace 700 illustrated in the above FIGS. may be utilized in order to enforce contours for a barrel section of an aircraft. FIG. 13 is a diagram illustrating multiple braces attached together to hold multiple panels into a barrel section in an exemplary embodiment. As shown in FIG. 13, panels 410-440 are arranged such that multiple skin lap joints 1000 may be completed together in order to form a barrel section 132. In this embodiment, the selection of brace 700 used for each panel depends on whether the panel will occupy the top/bottom of barrel section 132 (e.g., panels 410 and 430), or a side of barrel section 132.

Figure 14:
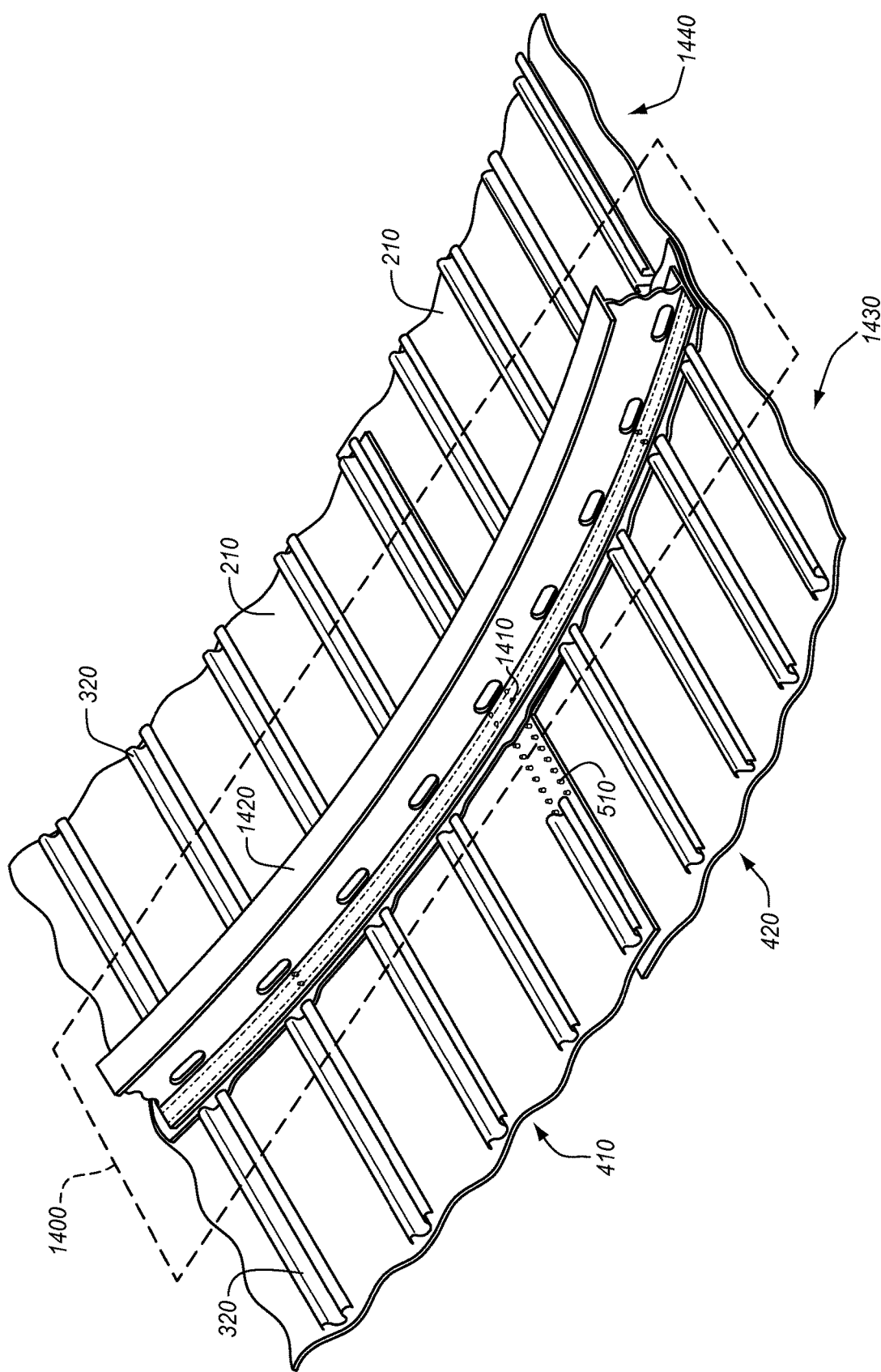
FIG. 14 is a diagram illustrating attachment holes for a brace in an exemplary embodiment.

The attachment of a brace to a panel as shown herein also does not necessitate new hardware, changes or other physical alterations to an individual panel. Hence, the braces discussed herein need not increase the fabrication time associated with completing an individual panel. FIG. 14 is a diagram illustrating attachment holes for a brace in an exemplary embodiment. Specifically, in FIG. 14, braces have been already removed from barrel sections 1430 and 1440, which are now joined via bulkhead 1420 (e.g., by sliding barrel section 1430 over bulkhead 1420).

In FIG. 14, body integration holes 1410 are illustrated, which are already part of the design of panels 410 and 420. Specifically, body integration holes 1410 have already been placed into panels 410 and 420 at locations intended to receive a portion of the airframe of aircraft 100. In this embodiment, the portion of the airframe is bulkhead 1420, which attaches a completed barrel section of fuselage to another barrel section of fuselage. These body integration holes 1410 intended for bulkhead 1420 (or any other suitable portion of the airframe) may be utilized to attach a segmented ring assembly of brace 700 to an end of a panel (e.g., panel 410 or panel 420), before the panels have been assembled into a barrel section 132. Hence, holes 1410 designed for bulkhead 1420 may beneficially be utilized by a brace 700 to facilitate the formation of skin lap joints between panels, while holes 1410 may also be used to facilitate barrel section joins with minimal out of tolerance contours and minimal shimming. Brace 700 may be removed before holes 1410 are needed for the installation of bulkhead 1420.

Illustrative details of the installation and/or operation of brace 700 will be discussed with regard to FIG. 15. Assume, for this embodiment, that a set of skin details 210 will be assembled into a hoopwise barrel section 132 of fuselage.

Figure 15:
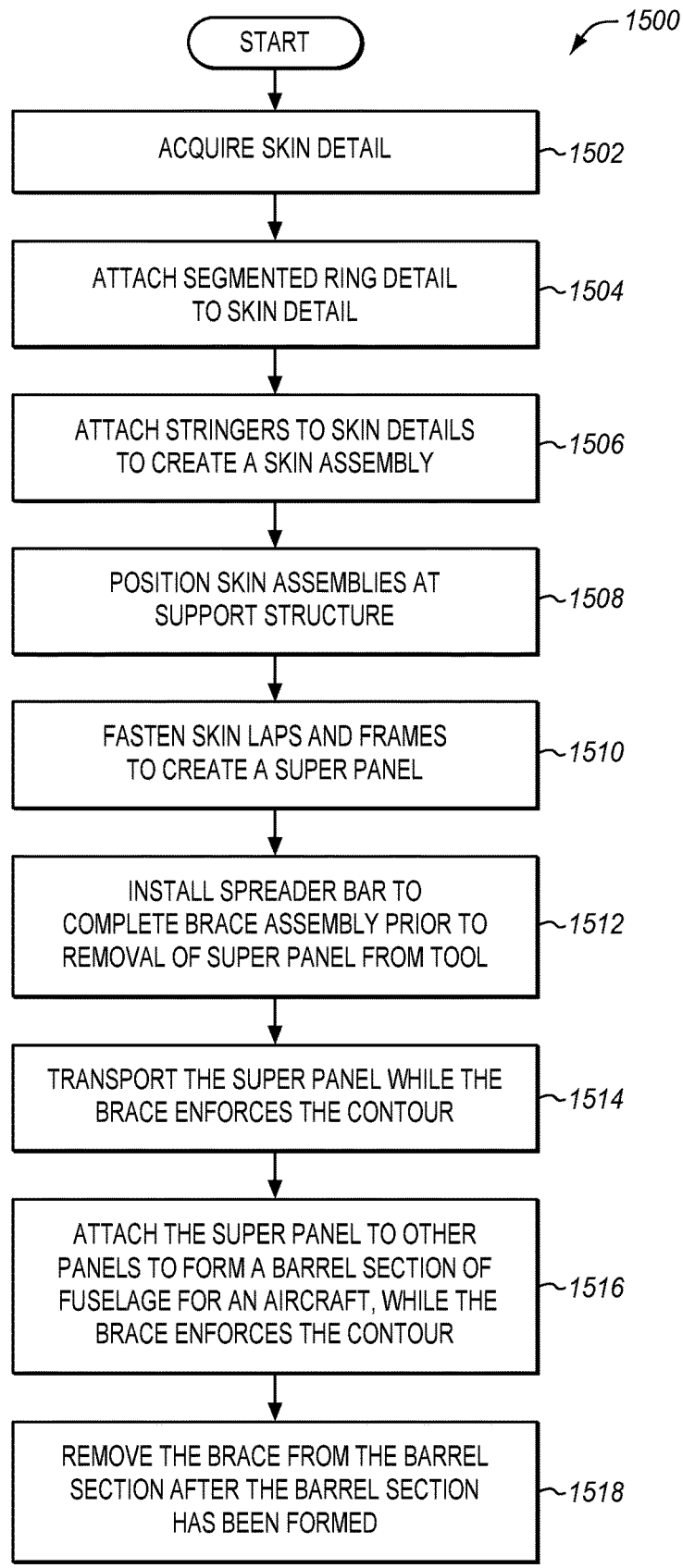
FIG. 15 is a flow chart illustrating a method for assembling a barrel section of fuselage while enforcing a contour onto a panel in an exemplary embodiment.

FIG. 15 is a flowchart illustrating a method 1500 for utilizing a brace 700 in an exemplary embodiment. The steps of method 1500 are described with reference to braces 700 illustrated in the prior FIGS., but those skilled in the art will appreciate that method 1500 may be performed for other braces as desired. The steps of the flowcharts described herein are not all inclusive and may include other steps not shown. The steps described herein may also be performed in an alternative order.

Skin details 210 are acquired for assembly, for example, by receiving the skin details 210 from a vendor (step 1502). Segmented ring details 852-856 are removably attached to skin details 210, to maintain a contour for skin details 210 (step 1504). As used herein, removable attachment refers to a form of attachment that does not require destructive work in order to remove. Furthermore, as used herein, removable attachment need not involve permanent alterations/deformation of the parts being attached. For example, in one embodiment removable attachment techniques do not involve drilling additional holes into the skin details 210 or otherwise damaging skin details 210. In order to construct a panel of fuselage, skin details 210 for fuselage 130 should be shaped and then attached to frames 310 and stringers 320. Thus, stringers 320 are attached to skin details 210 (step 1506) forming skin assemblies (e.g., 412, 414, 416). The skin assemblies are then positioned/placed onto support structure 600 (step 1508), and skin laps and frames are fastened to create panel 410, which is held at contour 450 (e.g., by supports, a jig, etc.) (step 1510). Panel 410 remains held to contour 450 by support structure 600, but panel 410 may be fabricated such that its internal stresses (or how the panel will be held on removal) will cause it to over- or under-contour. Thus, removal of panel 410 from support structure 600 causes panel 410 to change contour undesirably.

Since panel 410 will be removed from support structure 600 before it is transported to a location where it will be assembled into a barrel section 132, the change in contour will occur unless panel 410 is held in shape by an apparatus independent of support structure 600. To this end, brace 700 is completed by installing spreader section 800 (including spreader bar 810) onto panel 410 (step 1512), such that spreader bar 810 is attached to ring details on panel 410. In short, brace 700 enforces the contour onto panel 410 (step 1506). In a further embodiment, components of brace 700 may be attached, for example, by removably attaching each detail 852-856 of segmented ring assembly 850 to a different skin assembly (412, 414, 416) of panel 410, attaching spreader bar 810 to endpoints of an arc defined by ring assembly 850, and attaching struts 820 between spreader bar 810 and segmented ring assembly 850. In one embodiment, a brace 700 is attached to each end of panel 410 to ensure that contour 450 is enforced at both ends of panel 410. In a further embodiment, holes are placed into panel 410 at locations where panel 410 will attach to segmented ring assembly 850. For example, these holes may be body integration holes 1410 of FIG. 14. By attaching brace 700 to existing holes defined for panel 410, brace 700 becomes attached to each of skin assemblies 412-416, without directly attaching to support structure 600.

With brace 700 installed, the contour is enforced regardless of whether panel 410 remains attached to its support structure (e.g., brace 700 enforces the contour regardless of whether support structure 600 holds panel 410 in a desired contour). Hence, panel 410 (including any attached brace(s) 700) is transported while brace(s) 700 enforce the contour (step 1514). Upon arriving at a desired destination panel 410 is attached to other panels (e.g., 420, 430, 440) to form a barrel section 132 of fuselage for an aircraft, while braces 700 enforce the contours for their corresponding panels (step 1516). For example, braces 700 of different panels will be attached to each other, and then panels 410-440 are attached via skin lap joints 500 and frame splices. After completion of the barrel section, with panels locked in position by fastening of skin laps and frame splices, braces 700 are removed from barrel section 132 (step 1518). This may occur, for example, immediately after barrel section 132 has been completed, or after barrel section 132 has been transported along with braces 700 to a new location, is aligned with another barrel section 132, and is about to be joined with the other barrel section 132.

Using method 1500, contours that are defined for a panel (e.g., 410) by a support structure used to fabricate the panel may be beneficially temporarily enforced by brace 700 in order to ensure that the panel is properly integrated with other panels. This temporary enforcement of contour/shape may therefore continue even when the panels are removed from their corresponding supports and transported for assembly into barrel section 132. Brace 700 may then be removed after fulfilling its temporary role. This reduces the assembly time for barrel section 132, by ensuring that skin lap joints may be easily completed.

EXAMPLES

In the following examples, additional processes, systems, and methods are described in the context of braces that enforce contours for panels of aircraft fuselage.

Figure 16:
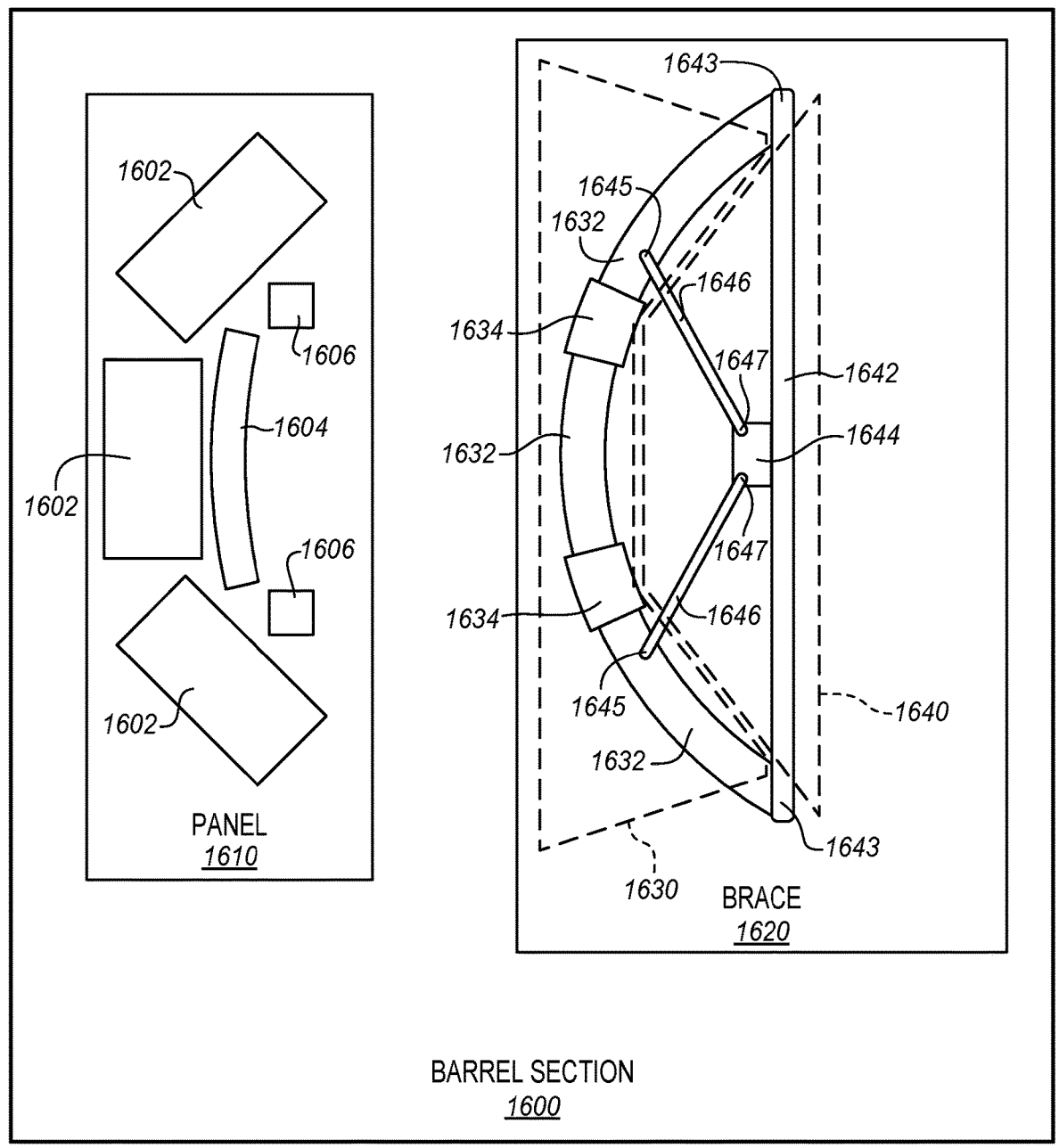
FIG. 16 is a block diagram of a brace for a panel of aircraft fuselage in an exemplary embodiment.

FIG. 16 is a block diagram of a portion of a barrel section 1660 in an exemplary embodiment. As shown in FIG. 16, barrel section 1660 includes panel 1610 and brace 1620. Other panels and braces have been omitted from this drawing for the sake of enhancing clarity, and as such, barrel section 1660 may include multiple panels 1610 and corresponding braces 1620 in order to form a full hoopwise/circular shape. In this example, panel 1610 includes skin details 1602, which are held together via frames 1604 and stringers 1606. Brace 1620 is attached to panel 1610 (e.g., to skin details 1602) via segmented ring assembly 1630, which includes segments 1632, and couplers 1634 that attach the ring segments together. Brace 1620 further includes spreader section 1640, which includes spreader bar 1642, and base 1644 to which struts 1646 are attached at attachment points 1647. Struts 1646 are attached to ring segments 1632 at attachment points 1645, and spreader bar 1642 is attached to ring segments 1632 at attachment points 1643. In this embodiment, the direct attachment of segments 1632 to skin details 1602 is not shown, as this would result in an overlap of segments 1632 and frame 1604.

Figure 17:
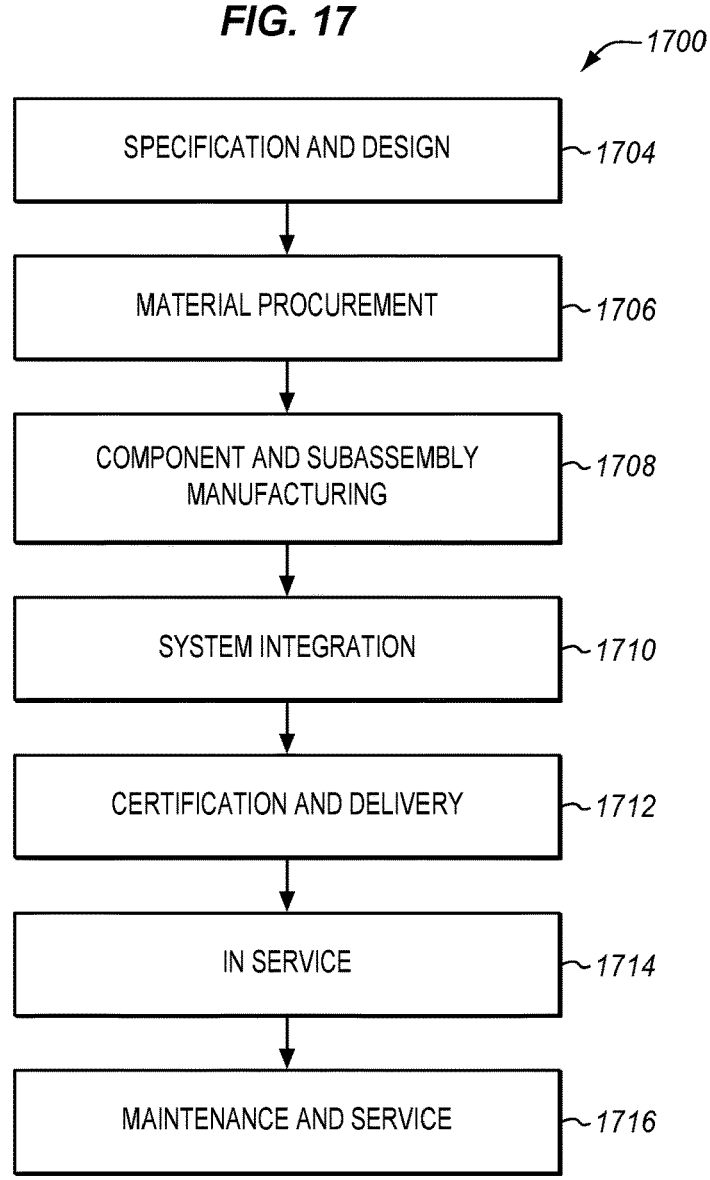
FIG. 17 is a flow diagram of aircraft production and service methodology in an exemplary embodiment.
Figure 18:
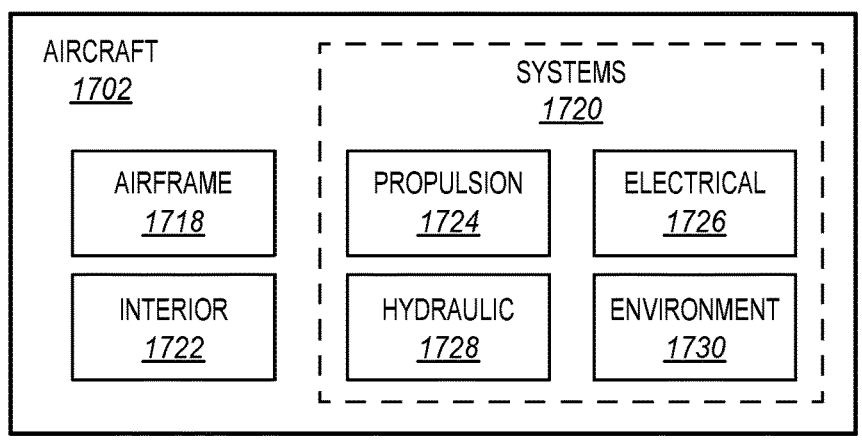
FIG. 18 is a block diagram of an aircraft in an exemplary embodiment.

Referring more particularly to the drawings, embodiments of the disclosure may be described in the context of an aircraft manufacturing and service method 1700 as shown in FIG. 17 and an aircraft 1702 as shown in FIG. 18. During pre-production, exemplary method 1700 may include specification and design 1704 of the aircraft 1702 and material procurement 1706. During production, component and subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine maintenance and service 1716 (which may also include modification, reconfiguration, refurbishment, and so on).

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 1702 produced by exemplary method 1700 may include an airframe 1718 with a plurality of systems 1720 and an interior 1722. Examples of high-level systems 1720 include one or more of a propulsion system 1724, an electrical system 1726, a hydraulic system 1728, and an environmental system 1730. Any number of other systems may be included. Although an aerospace example is shown, the principles of the invention may be applied to other industries, such as the automotive industry.

Apparatus and methods embodied herein may be employed during any one or more of the stages of the production and service method 1700. For example, components or subassemblies corresponding to production stage 1708 may be fabricated or manufactured in a manner similar to components or subassemblies produced while the aircraft 1702 is in service. Also, one or more apparatus embodiments, method embodiments, or a combination thereof may be utilized during the production stages 1708 and 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation, to maintenance and service 1716. For example, the techniques and systems described herein may be used for steps 1706, 1708, 1710, 1714, and/or 1716, and/or may be used for airframe 1718 and/or interior 1722. These techniques and systems may even be utilized for systems 1720, including for example propulsion 17 24, electrical 1726, hydraulic 1728, and/or environmental 1730.

In one embodiment, brace 700 enforces a contour onto a panel 400 during assembly of a barrel section of airframe 118, and is manufactured during component and subassembly manufacturing 1708. Brace 700 may then be removed after the barrel section is completed in subassembly manufacturing 1708.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:
1. An apparatus comprising:
 fuselage contour tooling comprising:
  a brace that removably mounts to an end of a panel and enforces a contour onto the panel, the brace comprising:
   a segmented ring assembly attached to skin details of the panel;
   a spreader bar attached to the segmented ring assembly at endpoints of an arc defined by the segmented ring assembly.
2. The apparatus of claim 1 wherein:
 the brace enforces the contour regardless of whether the panel is separated from a support structure used to fabricate the panel.

3. The apparatus of claim 1 wherein:
the brace includes attachment points on the segmented ring assembly that enable attachment of the brace to braces for other panels.

4. The apparatus of claim 1 wherein:
the segmented ring assembly comprises multiple segments, and each segment is attached to a different skin detail of the panel.

5. The apparatus of claim 1 wherein:
the spreader bar forms a non-linear shape.

6. The apparatus of claim 1 wherein:
the spreader bar is rotatably attached to the segmented ring assembly.

7. The apparatus of claim 1 wherein:
the panel is a portion of aircraft fuselage and the brace enforces the contour onto the panel during transport of the panel.

8. The apparatus of claim 1 further comprising:
struts that attach the spreader bar to the segmented ring assembly.

9. A system comprising:
a support structure defining a contour for shaping panels;
a panel that is mounted to the supports, comprising:
   multiple skin details that follow the contour; and
   stringers and frames that attach the skin details together; and
a brace that is mounted to an end of the panel, is distinct from the support structure, and enforces the contour during transport of the panel, the brace comprising:
   a segmented ring assembly attached to the skin details; and
   a spreader bar attached to the segmented ring assembly at endpoints of an arc defined by the segmented ring assembly.

10. The system of claim 9 wherein:
the brace enforces the contour regardless of whether the panel is separated from the support structure.

11. The system of claim 9 wherein:
each skin detail comprises an aluminum sheet.

12. The system of claim 9 wherein:
the segmented ring assembly comprises one ring element attached to each skin detail in the panel.

13. The system of claim 9 wherein:
the spreader bar is rotatably attached to the segmented ring assembly.

14. The system of claim 9 further comprising:
struts that are rotatably attached to the spreader bar and are rotatably attached to the segmented ring assembly.

15. The apparatus of claim 1 wherein:
the brace further comprises a base to which struts are rotatably attached.

16. The apparatus of claim 1 wherein:
the brace further comprises attachment points disposed at the endpoints of the arc defined by the ring assembly, for attachment the spreader bar to the segmented ring assembly.

17. The apparatus of claim 1 wherein:
the brace defines an indented region.

18. The system of claim 9 wherein:
the brace further comprises a base to which struts are rotatably attached.

19. The system of claim 9 wherein:
the brace further comprises attachment points disposed at the endpoints of the arc defined by the ring assembly, for attachment the spreader bar to the segmented ring assembly.

20. The system of claim 9 wherein:
the brace defines an indented region.

* * * * *